US011063639B1

(12) United States Patent
Legg et al.

(10) Patent No.: US 11,063,639 B1
(45) Date of Patent: Jul. 13, 2021

(54) WIRELESS COMMUNICATION FOR VEHICLE BASED NODE

(71) Applicant: BluWireless Technology Limited, Bristol (GB)

(72) Inventors: Peter Jonathon Legg, Bristol (GB); Raymond Mark McConnell, Bristol (GB)

(73) Assignee: BluWireless Technology Limited, Bristol (GB)

( * ) Notice: Subject to any disclaimer, the term of this patent is extended or adjusted under 35 U.S.C. 154(b) by 0 days.

(21) Appl. No.: 17/090,057

(22) Filed: Nov. 5, 2020

(51) Int. Cl.
  *H04B 7/04* (2017.01)
  *H04B 7/0404* (2017.01)
  *H04W 4/40* (2018.01)
  *H04B 7/08* (2006.01)
  *H04B 7/06* (2006.01)
  *H04W 84/12* (2009.01)

(52) U.S. Cl.
  CPC ......... *H04B 7/0404* (2013.01); *H04B 7/0617* (2013.01); *H04B 7/086* (2013.01); *H04W 4/40* (2018.02); *H04W 84/12* (2013.01)

(58) Field of Classification Search
  CPC ...... H04B 7/04; H04B 7/0404; H04B 7/0408; H04B 7/0413; H04B 7/086; H04B 7/0613; H04B 7/0617; H04B 7/08; H04B 7/0802; H04B 7/0817; H04W 4/40; H04W 84/12
  See application file for complete search history.

(56) References Cited

U.S. PATENT DOCUMENTS

| 8,477,692 | B2 * | 7/2013 | Ezaki ................. | H04B 7/18506 370/328 |
| 2005/0265286 | A1 * | 12/2005 | Umemura ............. | H04W 76/11 370/331 |
| 2006/0045033 | A1 * | 3/2006 | Fukuhara ............. | H04W 36/30 370/310 |
| 2016/0174241 | A1 * | 6/2016 | Ansari ................. | H01Q 1/32 370/329 |
| 2016/0269964 | A1 * | 9/2016 | Murray ................ | H04W 36/32 |
| 2016/0345221 | A1 * | 11/2016 | Axmon ............. | H04W 36/0009 |
| 2017/0187426 | A1 * | 6/2017 | Su .......................... | H04B 7/024 |
| 2017/0245192 | A1 * | 8/2017 | Sadri .................... | H04W 4/046 |
| 2017/0279636 | A1 * | 9/2017 | Giroud ................ | H04L 41/0816 |
| 2017/0339575 | A1 * | 11/2017 | Kim ...................... | G01S 5/0054 |

(Continued)

*Primary Examiner* — Siu M Lee
(74) *Attorney, Agent, or Firm* — Optimus Patents US, LLC

(57) ABSTRACT

A communication system supports communication between an end node of a vehicle and a remote correspondent node via a fixed network which comprises a plurality of wireless access points with a directional antenna arrangement for mm wave radio communication using directional beams. A vehicle comprises wireless modems employing electronically steerable beamforming directional antennas for establishing mm wave radio communication links to the access points. The access points communicate in a frequency channel alternately selected from one of two disjoint sets and a first wireless modem (111) is constrained to communicate using a frequency channel from the first set and a second wireless modem (701) is constrained to communicate using a frequency channel from the first set. A data session controller (705) communicates data of the data session over links provided by the first wireless modem and the second wireless modem.

13 Claims, 11 Drawing Sheets

(56) References Cited

U.S. PATENT DOCUMENTS

2017/0367053 A1* 12/2017 Noh .................... H04W 52/146
2018/0027555 A1* 1/2018 Kim ...................... H04B 7/022
                                                        370/329

* cited by examiner

WIRELESS COMMUNICATION FOR VEHICLE BASED NODE

FIELD OF THE INVENTION

The invention relates to support of communication with a vehicle based node, and in particular, but not exclusively, to wireless communication for a node on a car, truck, or bus.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example in order to support high capacity Internet access on board busses etc.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of fast moving vehicles using millimeter-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of the air interface in mm wave communication and with potentially fast-moving vehicles is a difficult challenge to address. This challenge is further exacerbated by the desire to provide this function in communication systems that are compatible with many existing network techniques and principles, such as Internet Protocol based routing, existing network-based mobility functions etc. However, most approaches for supporting communication for in particular fast moving vehicles tend to be suboptimal.

In particular, providing sufficient air interface capacity to support high rate communication with moving vehicles, such as for supporting Internet access to a high number of passengers on a bus, is a difficult challenge.

A critical part of efficiently utilizing the air interface resource is how to control and manage which access points support the wireless modems such that both reliable communication can be achieved and resource can be effectively exploited. This is particularly difficult for a fast moving vehicle. A further challenge is that it is desired to achieve such operation without substantially increasing complexity and requiring additional functionality. In particular, the introduction of additional or increased centralized or fixed network based resource management functions or access point selection functions is in many systems not only in conflict with underlying design principles but also tend to increase cost and complexity and result in more complex operations being necessary. For example, systems such as IEEE 802.11ad are based on the underlying desire to locate access point selection functions and operations at the remote stations rather than at the access points or network.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization and in particular air interface resource utilization, reduced signaling, facilitated and/or improved resource management and, improved access point selection performance, increased over the air communication capacity, reduced functionality requirements, improved performance, and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided a communication system for supporting communication between an end node of a vehicle moving along a predetermined route and a remote correspondent node via a fixed network, the communication system comprising: a plurality of wireless access points of the fixed network, each wireless access point having a directional antenna arrangement for mm wave radio communication using directional beams directed in a same first direction along the predetermined route; at least a first wireless modem and a second wireless modem arranged to establish mm wave radio communication links to wireless access points of the plurality of wireless access points, the mm wave radio communication links supporting a data session between the end node and the remote correspondent node, the first wireless modem and the second wireless modem being located on the vehicle and employing electronically steerable beamforming directional antennas for establishing the mm wave radio communication links using directional beams; wherein each wireless access point of the plurality of wireless access points is arranged to communicate with wireless modems using a frequency channel from either a first set of frequency channels or from a second set of frequency channels such that neighboring access points along the predetermined route use frequency channels from different sets of the first set of frequency channels and the second set of frequency channels; the first wireless modem is arranged to communicate using a frequency channel from the first set of frequency channels and the second wireless modem is arranged to communicate using a frequency channel from the second set of frequency channels; the wireless access points are arranged to provide directional beams providing overlapping coverage between neighboring access points along the predetermined route; and the communication system further comprises a data session controller arranged to communicate data of the data session over links provided by the first wireless modem and the second wireless modem, the data session controller being located on the vehicle.

The invention may provide improved and/or facilitated operation and/or improved performance for a beamform based mm wave radio communication system supporting (potentially fast) moving vehicles. The approach may, in particular, provide efficient and reliable communication in many scenarios and embodiments, and may in many embodiments provide more efficient utilization of the available air interface resource. The approach may in many embodiments provide improved consistency and reduced data interruption and/or performance degradation.

The approach may in particular allow more reliable and/or improved and/or facilitated access point selection and utilization for a vehicle moving along a predetermined route. A more robust access point selection may be achieved in many scenarios, and specifically may be achieved for wireless modems forming beams in the same general direction. Further, this may in many embodiments and scenarios be achieved while still allowing a continuous connection to the fixed network for a given data session. The approach may for example provide improved performance for vehicle for which it is not feasible to mount wireless modems capable of forming beams in opposite directions (such as e.g. when it is not practical to mount modes to form beams in both forwards and backwards directions).

The use of beams from directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

The wireless modems, data session controller, and/or end node may be in/on/attached to/move with etc. the vehicle, and may be part of a mobile network that moves with the vehicle.

The first set of frequency channels and the second set of frequency channels are disjoint sets. The first set of frequency channels and the second set of frequency channels are different sets. No frequency channel is included in both the first set of frequency channels and in the second set of frequency channels. Neighboring access points along the predetermined route may alternately use frequency channels from the first set of frequency channels and from the second set of frequency channels.

The first wireless modem cannot communicate using a frequency channel from the second set of frequency channels and the second wireless modem cannot communicate using a frequency channel from the first set of frequency channels.

Neighboring access points may be adjacent access points along the predetermined route. The data session controller may be arranged to provide a common link to a vehicle (based) network for links of the first wireless modem and of the second wireless modem. The data session controller may be arranged to form a common link for the data session by combining links of the first wireless modem and links of the second wireless modem.

In some embodiments, the coverage area for an access point includes a neighbor access point in the first direction. The range of an access point may exceed a distance to a neighbor access point in the first direction.

In accordance with an optional feature of the invention, the first wireless modem and the second wireless modem are arranged to form beams having a main direction constrained to an angular interval not exceeding 90° from a movement direction of the vehicle.

The approach may provide improved operation and/or performance and/or facilitated implementation for wireless modems forming beams in the same constrained angular interval corresponding to a forwards or backwards direction.

In accordance with an optional feature of the invention, the angular interval includes an angle in an opposite direction along the predetermined route to the first direction when the vehicle is moving in the opposite direction to the first direction along the predetermined route.

The approach may provide improved operation and/or performance and/or facilitated implementation for wireless modems forming beams in the same general direction, such as in a forward direction for the vehicle.

In accordance with an optional feature of the invention, the angular interval includes an angle in an opposite direction along the predetermined route to the first direction when the vehicle is moving in the first direction along the predetermined route.

The approach may provide improved operation and/or performance and/or facilitated implementation for wireless modems forming beams in the same general direction, such as in a rearward direction for the vehicle.

In accordance with an optional feature of the invention, a distance between the electronically steerable beamforming directional antennas of the first wireless modem and the second wireless modem does not exceed 20 meters.

In accordance with an optional feature of the invention, the data session controller is arranged to form a common link for the data session in response to a selection between a link of the first wireless modem and a link of the second wireless modem, the data session controller being arranged to change a selection from the link of the first wireless modem to the link of the second wireless modem while the link of the first wireless modem is active.

The common link may be a common link provided for the first wireless modem and the second wireless modem to a network of the vehicle.

In accordance with an optional feature of the invention, the data session controller is arranged to select a link for data of the date session in response to a link quality for a link of the first wireless modem and a link quality of a link of the second wireless modem.

In accordance with an optional feature of the invention, the data session controller is arranged to form a common link for the data session as a combination of a link of the first wireless modem and a link of the second wireless modem, the data session controller being arranged to communicate data of the data session over both the link the first wireless modem and the link the second wireless modem.

The data session controller may be arranged to simultaneously/in parallel communicate data of the data session over both links of the first wireless modem and the second wireless modem when both of the wireless modems have established links with an access point.

In accordance with an optional feature of the invention, the communication system further comprises a link controller arranged to initiate a link setup by the second wireless modem in response to a mm wave radio link property for a link of the first wireless modem meeting a criterion.

In accordance with an optional feature of the invention, the criterion includes a requirement that a radio link quality measure for the link of the first wireless modem exceeds a quality threshold.

In accordance with an optional feature of the invention, the criterion includes a requirement that a radio link quality measure for the link of the first wireless modem is below a quality threshold.

In accordance with an optional feature of the invention, the communication system further comprises a link controller arranged to terminate an active link of the first wireless modem in response to a link being formed by the second wireless modem.

According to an aspect of the invention there is provided an apparatus for a communication system for supporting communication between an end node of a vehicle moving along a predetermined route and a remote correspondent node via a fixed network, the communication system comprising: a plurality of wireless access points of the fixed network, each wireless access point having a directional antenna arrangement for mm wave radio communication using directional beams directed in a same first direction along the predetermined route; and the apparatus comprising: at least a first wireless modem and a second wireless modem arranged to establish mm wave radio communication links to wireless access points of the plurality of wireless access points, the mm wave radio communication links supporting a data session between the end node and the remote correspondent node, the first wireless modem and the second wireless modem being located on the vehicle and employing electronically steerable beamforming directional antennas for establishing the mm wave radio communication links using directional beams; wherein each wireless access point of the plurality of wireless access points is arranged to communicate with wireless modems using a frequency channel from either a first set of frequency channels or from a second set of frequency channels such that neighboring access points along the predetermined route use frequency channels from different sets of the first set of frequency channels and the second set of frequency channels; the first wireless modem is arranged to communicate using a frequency channel from the first set of frequency channels and the second wireless modem is arranged to communicate using a frequency channel from the second set of frequency channels; the wireless access points are arranged to provide directional beams providing overlapping coverage between neighboring access points along the predetermined route; and the apparatus further comprises a data session controller arranged to communicate data of the data session over links provided by the first wireless modem and the second wireless modem, the data session controller being located on the vehicle.

According to an aspect of the invention there is provided a communication system supporting communication between an end node of a vehicle moving along a predetermined route and a remote correspondent node via a fixed network, the communication system comprising: a plurality of wireless access points of the fixed network, each wireless access point having a directional antenna arrangement for mm wave radio communication using directional beams directed in a same first direction along the predetermined route; at least a first wireless modem and a second wireless modem arranged to establish mm wave radio communication links to wireless access points of the plurality of wireless access points, the mm wave radio communication links supporting a data session between the end node and the remote correspondent node, the first wireless modem and the second wireless modem being located on the vehicle and employing electronically steerable beamforming directional antennas for establishing the mm wave radio communication links using directional beams; the method comprising: each wireless access point of the plurality of wireless access points is communicating with wireless modems using a frequency channel from either a first set of frequency channels or from a second set of frequency channels such that neighboring access points along the predetermined route use frequency channels from different sets of the first set of frequency channels and the second set of frequency channels; the first wireless modem communicating using a frequency channel from the first set of frequency channels and the second wireless modem is arranged to communicate using a frequency channel from the second set of frequency channels; the wireless access points providing directional beams providing overlapping coverage between neighboring access points along the predetermined route; and a data session controller communicating data of the data session over links provided by the first wireless modem and the second wireless modem, the data session controller being located on the vehicle.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
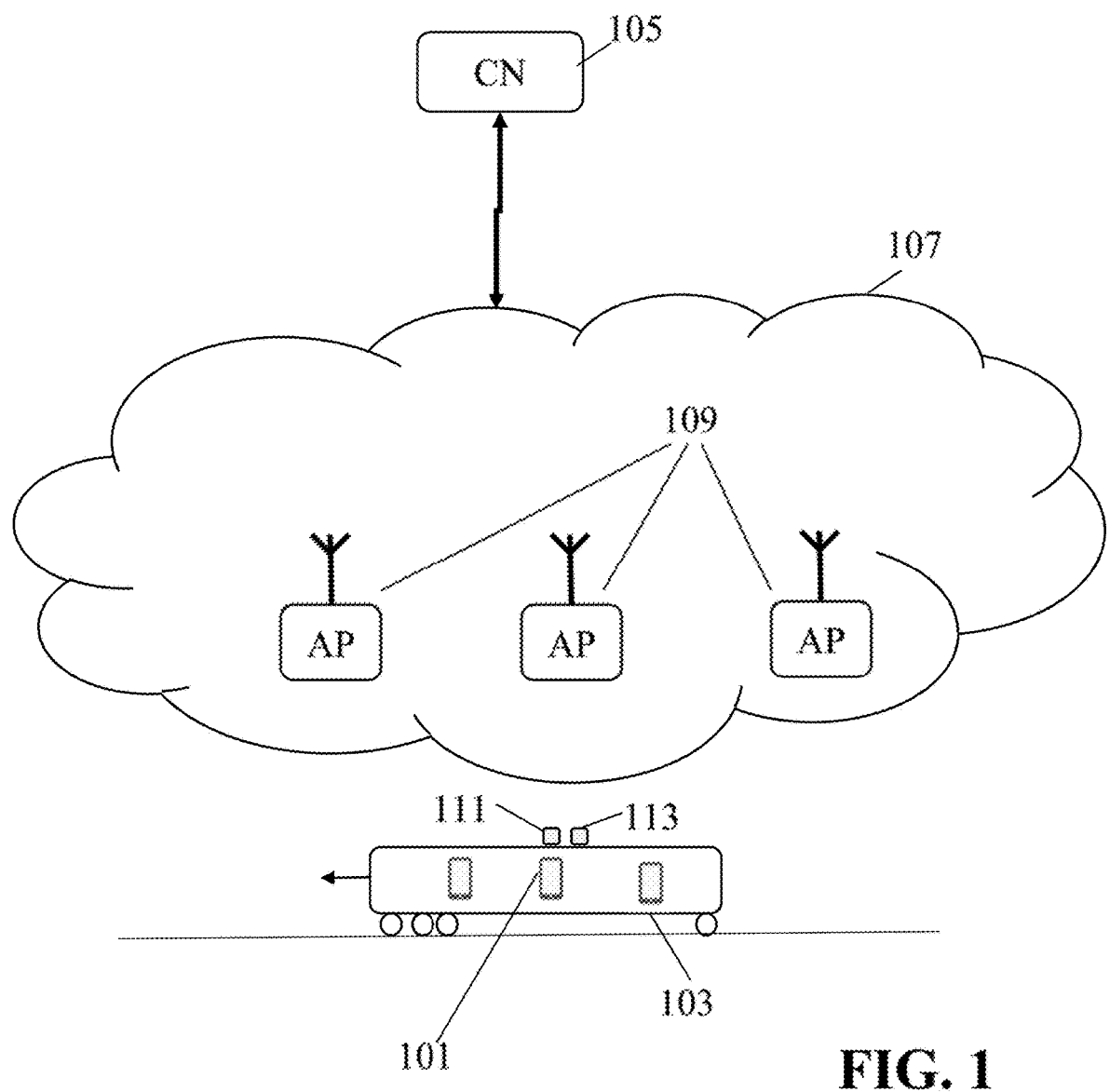
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and vehicles. The following description will focus on an example in which the vehicle is a car or a bus, but it will be appreciated that in other embodiments the end node may be part of other vehicles.

In the example of FIG. 1, a communication/data session is established between a correspondent node 105 and an end node 101 located in a bus/car/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

a. The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

b. The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the corresponding node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet and/or that the Internet may form part of the fixed network 107.

It will be appreciated that although FIG. 1 (and the following) figures focus on description of communication for one end node, the system will typically support simultaneous communication for a large number of end nodes and in many embodiments, the combined data rate for communication to/from the vehicle may be in the order of several tens or even hundreds of Gigabit per second.

The coupling of the fixed network 107 to nodes on the bus/vehicle 103 is supported by wireless radio communication links. For this purpose, the fixed network 107 comprises a plurality of wireless access points (APs) 109 which in the specific example may be a relatively large number of stationary access points e.g. positioned along a race track to support communication for a racing car.

Correspondingly, the bus/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the vehicle and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are in the example individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113.

In a specific embodiment of using the IEEE 802.11ad wireless technology, the AP and the two modems would form a BSS (basic service set). A scheduler may accordingly allocate data packets to an individual link by associating them with the appropriate MAC address. In particular, each AP may comprise a MAC layer scheduler which performs scheduling of date over the air interface of the AP based on MAC addresses. In many systems, the scheduling is based on a TDMA scheduling allocating time intervals/slots for individual air interface links (in some embodiments allocation may be in fixed duration time slots but in other systems allocation may be in variable duration time slots or intervals).

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a car, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a motorway, access points may be distributed for each, e.g. 500 m–1 km of track.

As a consequence, the radio conditions will tend to change quickly for the wireless modems 111, 113, and specifically the optimum access points 109 to which to connect tend to change quickly, e.g. for a bus or car moving along a road at a potentially high speed. Furthermore, the directional radio beam of the wireless modems 111, 113 cannot necessarily be steered over all directions, but may be limited to e.g. a 90-180° range in the horizontal (azimuth) plane. In order to support such scenarios, the system supports switching between different access points 109 such that a connection from an end node 101 to the fixed network 107 (and the correspondent node 105) can be sequentially supported by different access points 109 and modems 111, 113 as the vehicle 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle.

Figure 2:
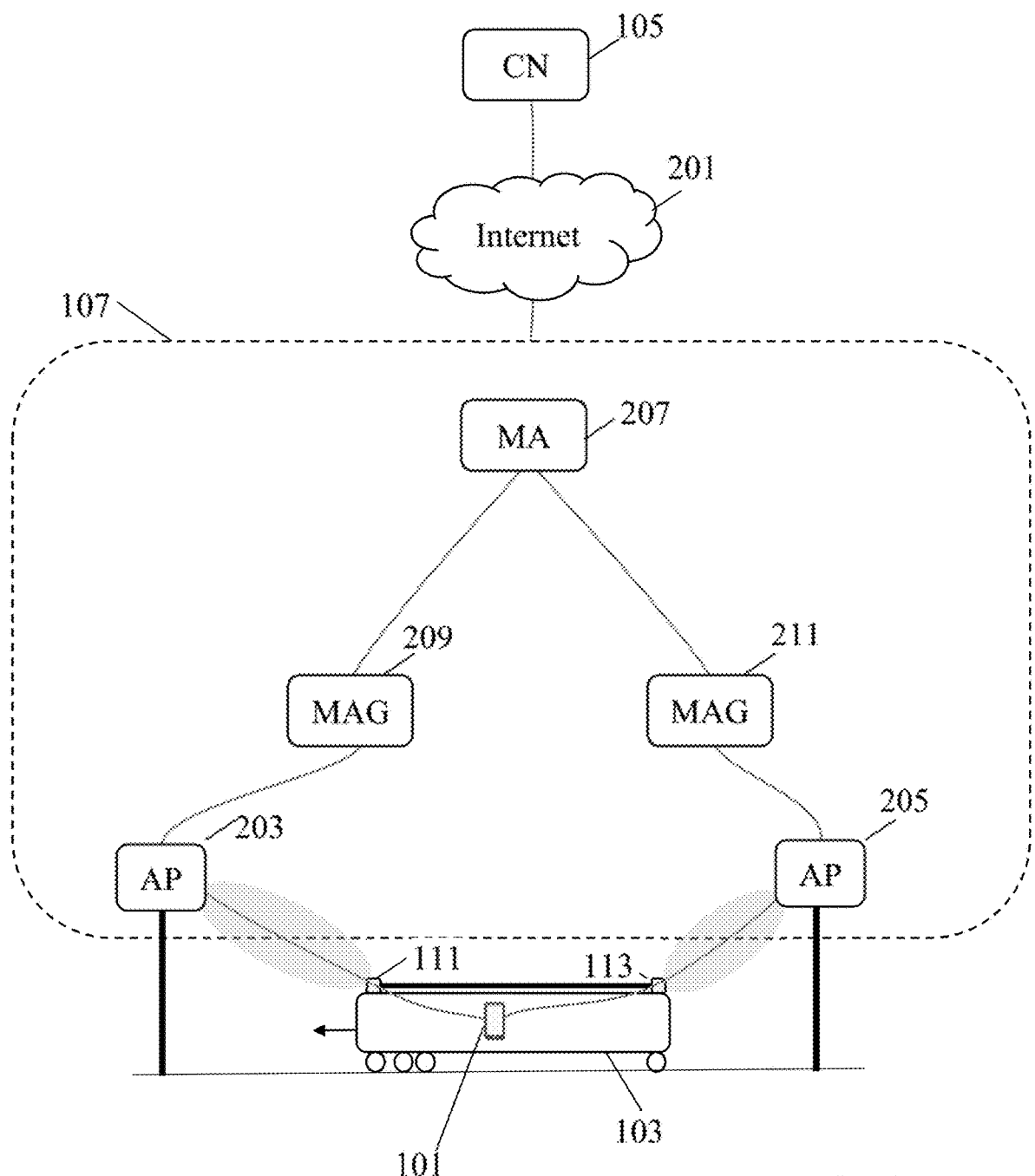
FIG. 2 illustrates an example of elements of a wireless communication system in accordance with some embodiments of the invention.

FIG. 2 which shows an example of a specific scenario of FIG. 1 in which an end node 101 in a vehicle 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

FIG. 2 illustrates a specific situation in which the vehicle 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 103 have established a data session which is supported by the fixed network 107. For example, the correspondent node 105 may operate a web server providing a web service to a client running on a device implementing the end node 101. As a specific example, a passenger on the vehicle may operate a web browsing application which operates a web browsing client that initiates and supports a web service provided by the correspondent node 105.

The fixed network 107 provides connections that can be used by the client and the server. In order to support the mobility of the fast moving vehicle, the fixed network 107 may in some examples comprise a mobility anchor (MA) 207 which operates as a fixed anchor for the mobile nodes of the vehicle 103. Specifically, the mobility anchor 207 operates as a common fixed anchor in the fixed network 107 for all the wireless modems 111, 113 of the vehicle 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the vehicle. This may for example be achieved by the mobility anchor 207 advertising that it is a mobility anchor 207 for the wireless modems 111, 113 (or other nodes on the vehicle 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the vehicle 103.

The system may accordingly operate a mobility anchor functionality which provides a fixed anchor point for the mobile nodes of the vehicle 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the vehicle moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205. Indeed, each MAG 209, 211 may be associated with a different segment of the network.

The mobility anchor 207 is accordingly a common mobility anchor for a plurality of the wireless modems 111, 113 of the vehicle 103, and typically for all of the wireless modems 111, 113.

In many practical systems, some or all of the access points 109, 203, 205 may be substantially colocated and coupled together through network entities that allow short routing paths between them.

Figure 3:
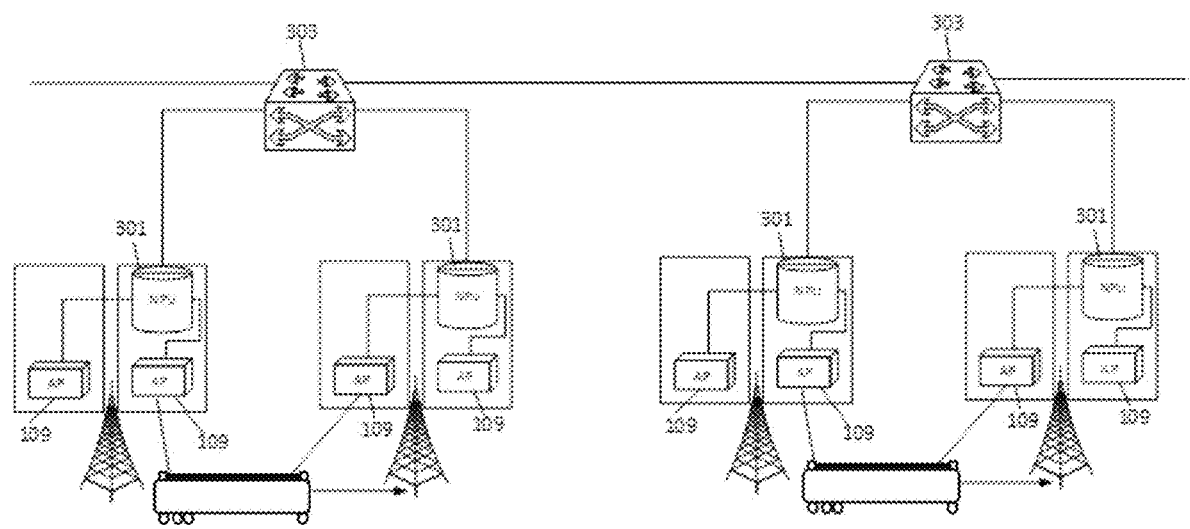
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. The switches or routers 303 may further connect to the rest of the fixed networks, e.g. through interface routers/switches 305.

Figure 4:
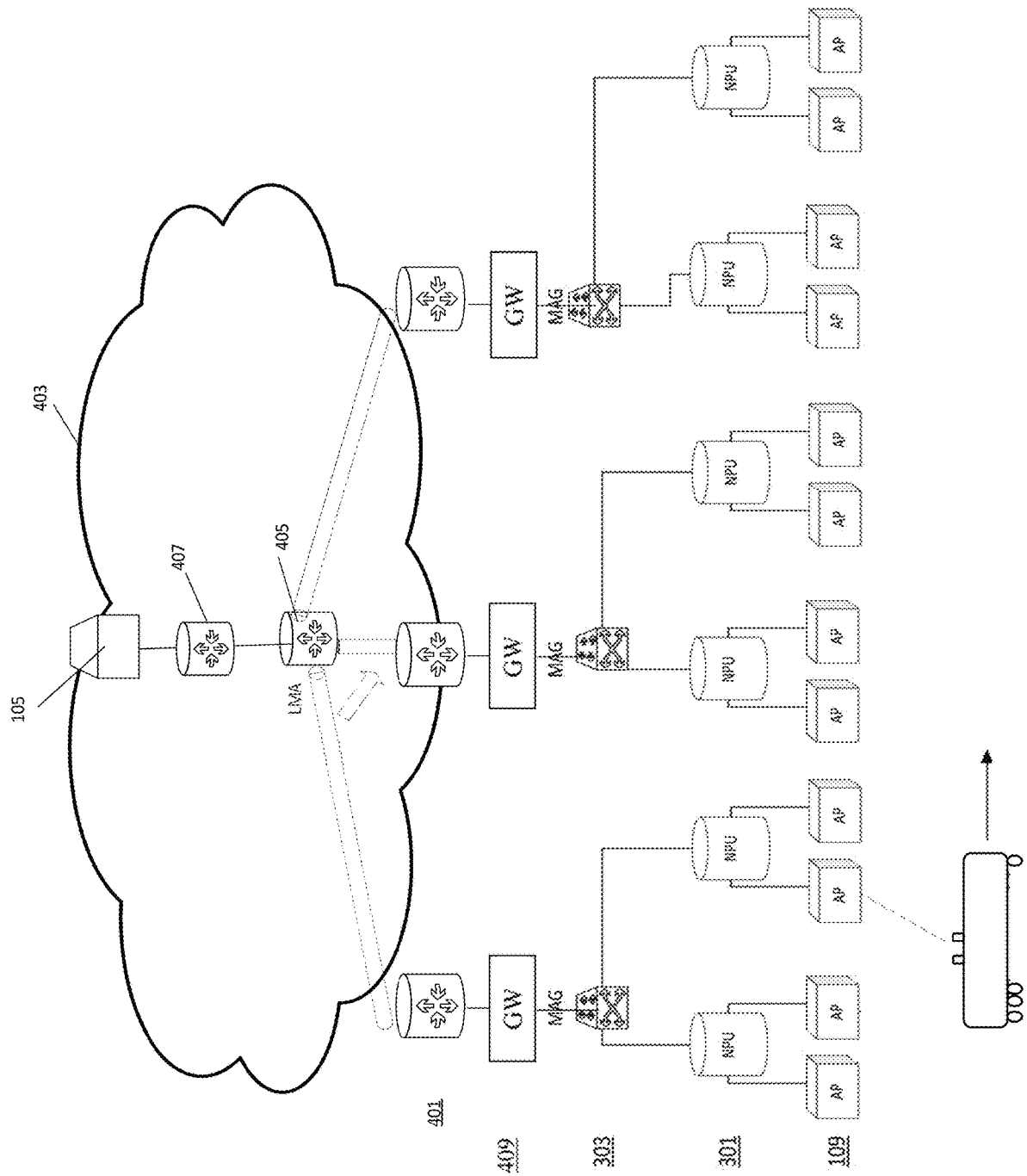
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a vehicle along a road or circuit. Such a proprietary system may accordingly provide a number of interface points with capability of providing a MAG function for the moving vehicle. The system may for example provide a proprietary access network that may be coupled to other networks via suitable interface connections and gateways.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

Figure 5:
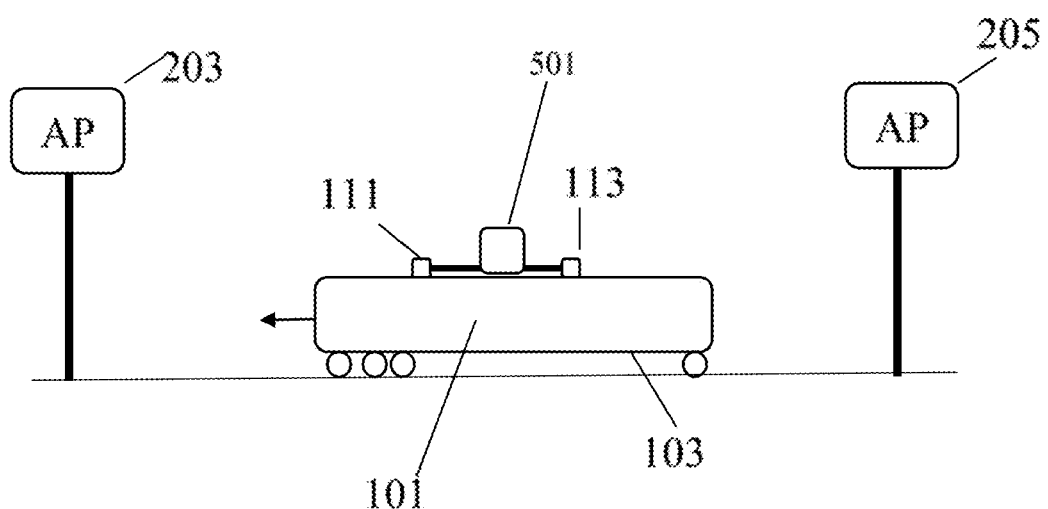
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed. Thus, the wireless modems 111, 113 may be part of a vehicle network that supports communication for end nodes. The network may for example include IEEE 802.11 network elements and access points for the end nodes.

Figure 6:
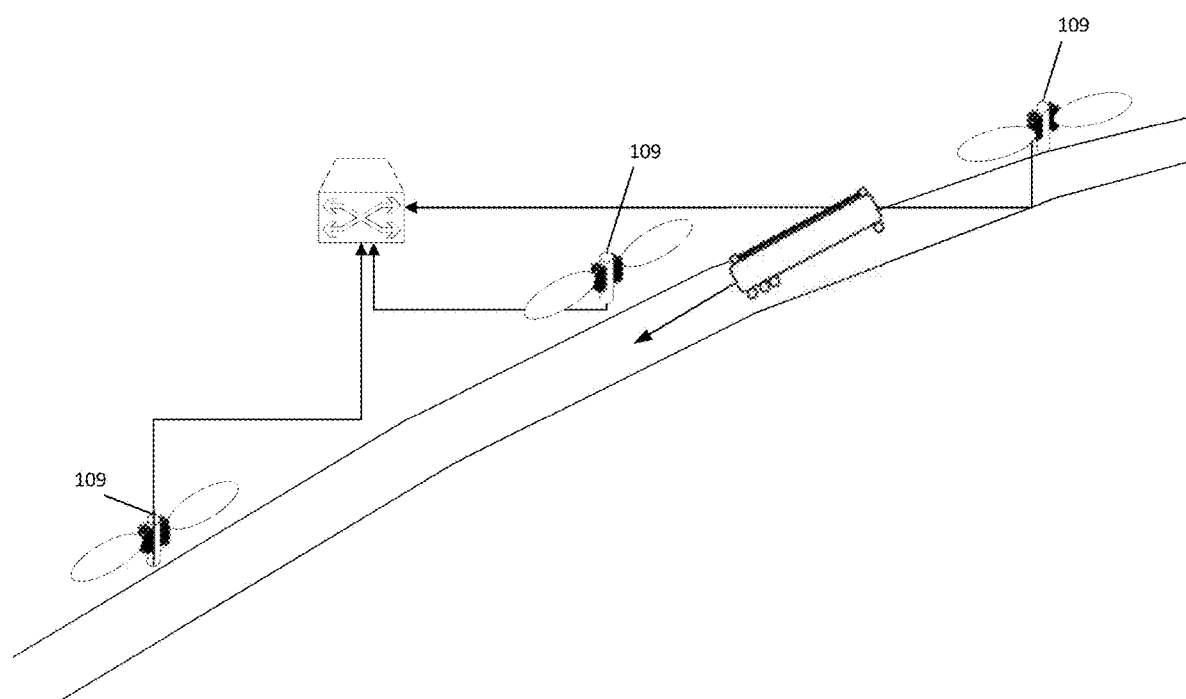
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a route (also referred to as downroute) and another colocated access point 109 may permanently direct a beam up the route in the other direction (also referred to as uproute). A vehicle downroute from the position may then be connected via a wireless link with the first access point 109 and a vehicle uproute from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

a. In the previously described examples, two wireless modems 111, 113 were used to establish links between the vehicle 103 and the fixed network 107. The two wireless modems 111, 113 are in the examples positioned towards opposite ends of the vehicle 103. In some embodiments, the vehicle 103 may comprise more wireless modems and in particular it may in many embodiments be advantageous to have a plurality colocated wireless modems.

b. In particular, in many embodiments, rather than having a single wireless modem towards the front of the vehicle, there may be two wireless modems forming beams in the forwards direction. Similarly, rather than having a single wireless modem towards the back of the vehicle, there may be two wireless modems forming beams in the backwards direction (or only the wireless modem pair towards the front or rear of the vehicle 103 may be implemented). Thus, in such an example, there may be a plurality of links available. In some systems, there may be implemented a scheduling function which freely and dynamically can allocate data over the four different air interface links thereby allowing these to be fully optimized.

Figure 7:
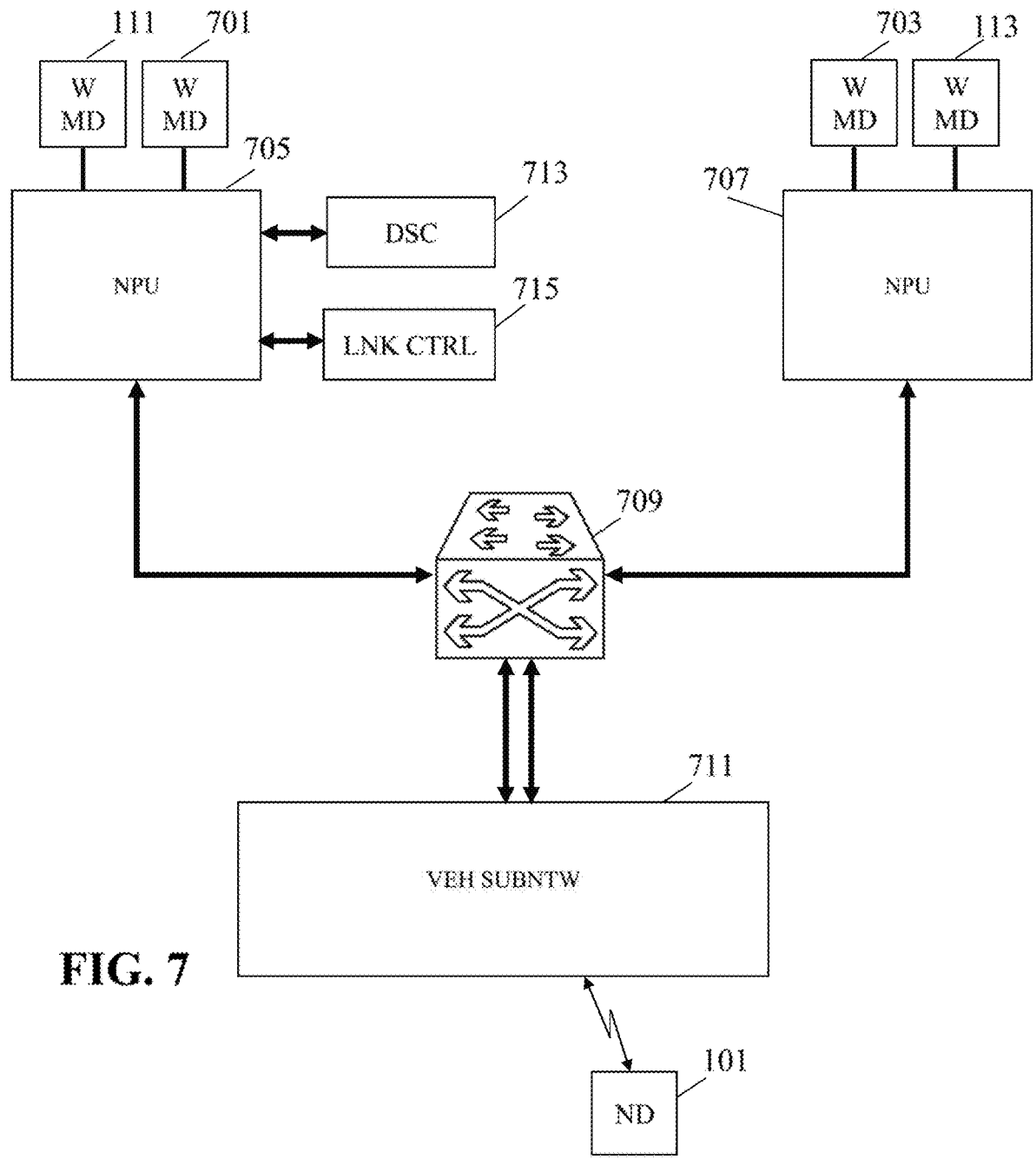
FIG. 7 illustrates an example of elements of a vehicle based network subsystem of a wireless communication system in accordance with some embodiments of the invention.

FIG. 7 illustrates an example of a vehicle network of the vehicle. The vehicle network may include all elements of the communication system which are located on the vehicle/moves with the vehicle.

In the example of FIG. 7, the vehicle network comprises four wireless modems 111, 113, 701, 703 being arranged into pairs.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a vehicle subnetwork 711 which supports end nodes 101 on the vehicle such that these can interact with the remaining parts of the communication system. The vehicle subnetwork 711 provides access points to the end nodes on the vehicle and allow them to communicate with remote nodes of the fixed part of the communication system via the wireless modems 111, 113, 701, 703, It may in the example provide routes to the wireless modems via the switch 709 and NPUs 705, 709 but it will be appreciated that in other embodiments other configurations may be possible and the vehicle subnetwork 711 may directly be coupled to the wireless modems 111, 113, 701, 703. In the specific example, the NPUs 705, 707 and vehicle subnetwork 711 may specifically be coupled to the switch 709 via Ethernet connections and the switch 709 may be an Ethernet switch. In many embodiments, the vehicle 103 may only comprise one pair of wireless modems and one NPU.

It will be appreciated that the vehicle subnetwork 711 may include and implement various other network functions including resource control, scheduling and allocation functions, routing adaptation, data session setup functionality etc. The vehicle subnetwork 711 may implement any appropriate network function required or desired for the implementation of a vehicle network that can support vehicle based end nodes and which can communicate and interface with the fixed network and access points.

The vehicle subnetwork 711 may in many embodiments consist in or comprise a Wi-Fi subsystem. The WiFi subsystem may e.g. provide wireless WiFi access throughout the vehicle, such as throughout a bus, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem may for example be a conventional WiFi system such as an IEEE 802ac (or earlier) system. Thus, a user on a moving vehicle, such as a bus, may simply access a conventional local WiFi access point to gain Internet access.

In the system described, the wireless modems employ electronically steerable beamforming directional antenna that form a beam, and more specifically that form a directional pattern having a main beam that can be steered. In many embodiments, the wireless modems may form beams in substantially the same directions.

For example, in the example of FIG. 7, one pair wireless modems 111, 701 may employ electronically steerable beamforming directional antennas that are directed in substantially the same directions, specifically in the direction of movement or in the opposite direction of movement, specifically the directional antenna may be directed in the forwards direction of the vehicle or in the backwards direction of movement. Similarly, the other two co-located modems 113, 703 may employ directional antennas that are also directed in the same directions as each other but in the opposite direction of the first pair of wireless modems 111, 701. Thus, the second pair of co-located wireless modems may be in the direction of movement or in the opposite direction (forwards/backwards) but will be opposite to the first pair of wireless modems 111, 701. This may result in two wireless modems 111, 701 having beams formed generally in the forward direction (direction of movement) and two modems 113, 703 having beams formed generally in the backward direction (or vice versa). The two pairs of wireless modems may e.g. be located at the front and the rear of the vehicle respectively. In many embodiments, the vehicle 103 may only comprise one set or pair of wireless modems and e.g. may only provide wireless modems that form beams in the forward direction or in the backward direction of the vehicle.

In the example, wireless modems forming beams in the same direction may typically be close to each other. In many embodiments the distance between the electronically steerable beamforming directional antennas of the wireless modems forming beams in the same direction may not exceed 20, 15, 10, or 5 meters. Indeed, in many embodiments, the wireless modems and antennas may be substantially co-located and e.g. within 1 meter of each other (or even less).

The close proximity may facilitate implementation and in many practical applications substantially facilitate mounting of the wireless modems on the vehicle, including reducing requirements for potential cabling etc. Another advantage is that the knowledge of the likely radio coverage at a given fixed point from different access points can be exploited to determine the likely performance of potential radio links formed to the multiple co-located modems at that point. Co-location also allows the modems to be mounted into a single physical unit.

In many embodiments, the wireless modems may comprise a beam adapter which is arranged to adaptively steer the main beam of the electronically steerable beamforming directional antenna towards the appropriate access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna phase and amplitude coefficients to direct the main beam towards the relevant access points, e.g. by applying a beam steering algorithm maximizing the received signal strength or signal to noise ratio as is well known in the art. As another example, more mechanical solutions may be used. For example, a horn antenna being electronically steerable using a stepper motor with electronic control may be used.

Each of the wireless modems may be arranged to form beams within an angular interval. This angular interval may typically be no larger than 90° relative to a nominal (forwards or backwards) movement direction of the vehicle. For example, vehicles such as cars, busses, lorries, boats, ferries, vehicles, planes etc. have a nominal/default forwards direction and a nominal/default direction (corresponding to the vehicle 103 moving straight and not turning). The beamforming by a wireless modem may typically be along this direction with a certain deviation being allowed or possible. However, in most embodiments, the maximum deviation from this direction does not exceed 90°, and indeed in many embodiments, it may be substantially smaller.

Thus, a forward facing beam direction for a vehicle 103 may include a range of directions that include the nominal forward direction of movement for the vehicle 103. However, the range is limited to not include directions that deviate from the nominal forward direction for the vehicle 103 by more than a given maximum angular value (which potentially may be asymmetric and thus different for positive and negative angles). This maximum angular value may not exceed 90° in many embodiments.

Similarly, a rearward facing beam direction for a vehicle 103 may include a range of directions that include the nominal rearward/backward direction of movement for the vehicle 103. However, the range is limited to not include directions that deviate from the nominal rearward/backward direction for the vehicle 103 by more than a given maximum angular value (which potentially may be asymmetric and thus different for positive and negative angles). This maximum angular value may not exceed 90° in many embodiments.

Thus, in many embodiments, the wireless modems may be arranged to generate directional beams that can be steered towards access points but with these directions being limited to either being in a forward angular interval or in a backward angular interval.

The wireless modems having beams pointing in the same direction may be suitable for forming wireless links with access points positioned in the same direction from the vehicle 103. For example, the two wireless modems having beams pointing in the forwards direction may both be suitable for establishing a wireless link with access points further ahead along the route/track. Similarly, the two wireless modems having beams pointing in the backwards direction may both be suitable for establishing a wireless link with an access point 109 being further backwards along the tracks. Wireless modems arranged to form beams in corresponding and typically substantially the same directions will be referred to as aligned wireless modems.

Having multiple wireless modems on a vehicle supporting the air interface connection to the supporting fixed network provides for a substantially more flexible and reliable connection for a mm wave system as it provides a plurality of possible access point links to be formed. The approach may allow for link diversity such that when a link established to one access point by one wireless modem fails due to the vehicle moving away from the access point, it is likely that another wireless modem has established a link to typically another access point. Having wireless modems forming beams in opposite directions may typically support such link continuity as the links may be formed in either direction, and thus may be to the access point that is closest to the current position of the vehicle.

An important feature and advantage of such an approach is that a link will typically always be possible, and that new links can be formed before existing links fail due to the movement of the vehicle. Thus, for the individual data session, there may always be at least one link available, and a continuous connectivity can be achieved by appropriately switching links. Specifically, the approach may provide a make before break link change when switching between access points.

However, whereas such link performance and support of data sessions may be suitable and advantageous in many scenarios and applications, it may not be ideal for all systems and scenarios. Specifically, the Inventors have realized that providing efficient and reliable link performance based only on wireless modems forming beams in the same directions along a predetermined route may be highly advantageous in many systems and scenarios. For example, being arranged to provide a continuous connection, and make before break link support, for a data session based only on forward directed or only on backward directed modems may be highly advantageous.

Indeed, in many systems and for many types of vehicle, it may simply not be practical to have wireless modems forming beams in different directions. Not only does this typically require additional wireless modems but it may also be physically impractical to mount modems facing in different directions. For example, for a racing car (or indeed a normal car) it may not be practical to mount wireless modems that point backwards, or possibly forwards. Also, being arranged to provide link continuity based only on aligned modems may often allow for a more practical and lower complexity as less coordination and control may often be provided. For example, if the wireless modems 111, 701 coupled to the first NPU 705 of FIG. 7 are both aimed in a forward direction, at would be advantageous for the first NPU 705 to achieve such link continuity to provide a single continuous link to the vehicle network 709. In parallel, the second NPU 707 may for example provide a single continuous link for backwards facing wireless modems 703, 113 to the vehicle network 709. This may facilitate the network operation and the management of the vehicle network 709. Thus, even for systems where a vehicle may have wireless modems directed in different directions, an efficient utilization and coordination between wireless modems forming beams in the same directions would be desirable.

However, such operation and coordination between wireless modems is not easy to achieve. Wireless modems in many systems, are based on wireless modems detecting the most suitable access point and accessing this. For example, in systems such as e.g. IEEE802.11ad, wireless modems search for beacon transmissions from access points and attach to the strongest. For example, wireless modems forming beams in the same direction will tend to access the same access points and thus setup links that tend to have closely correlated performance and to e.g. drop at the same time. This will reduce diversity performance and make it difficult to achieve continuous connections and support for data sessions. Introducing additional selection logic to modify access point selection tends to be cumbersome, risky, complex, and not optimally reliable.

In the following, an approach will be described in more detail with reference to the described system of FIGS. 1 to 8. The following description will focus on a description relating to access points that form beams in the same direction along a predetermined route, such as a road. However, it will be appreciated that these access points may only be a subset of the total number of access points deployed in the system, and that in particular there may typically be another set of access points with beams formed in the opposite direction. For example, as in the example of FIG. 6, a communication system may comprise pairs of co-located access points having beams in opposite directions and the following description will focus on the operation of the access points only forming beams in one direction and on how these interact with wireless modems forming beams in the opposite direction (such that the access points and wireless modems form beams in opposite directions i.e. towards each other).

Figure 8:
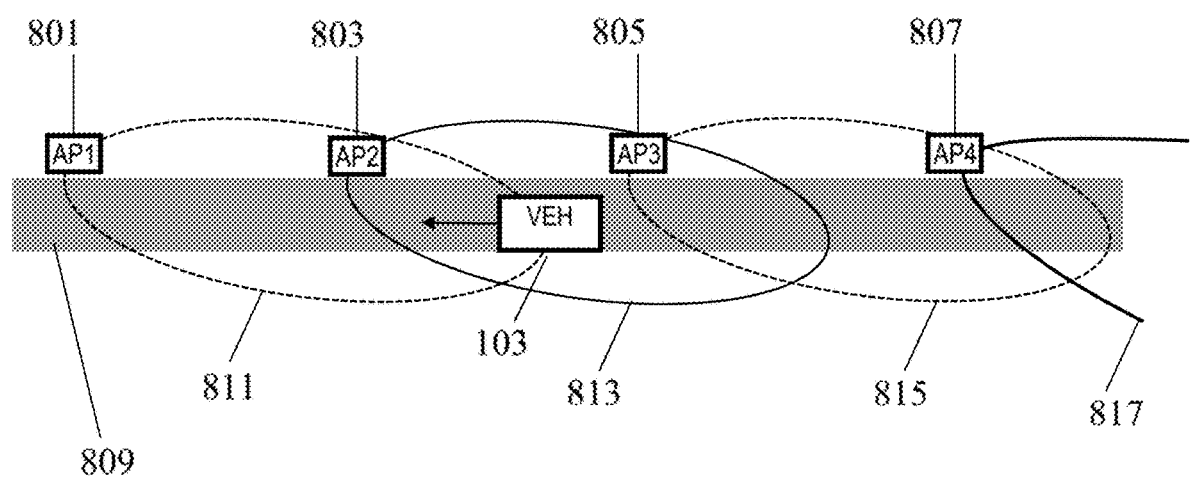
FIG. 8 illustrates an example of a configuration of a wireless communication system in accordance with some embodiments of the invention.

FIG. 8 illustrates an example of elements of such a system. FIG. 8 specifically show four access points 801-807 which are arranged to form beams in the same direction along a predetermined route 809.

In the approach the vehicle 103 is arranged to move along a predetermined route. For example, the access points may support vehicles travelling along a motorway or may support a vehicle moving along a vehicle track, such as a race track. The predetermined route may in some embodiments provide a line of positions or may in some embodiments include a set or range of possible positions. For example, the vehicle 103 may travel along a predetermined route formed by a vehicle track or may e.g. travel along a predetermined route defined by a set of tracks or e.g. a road with multiple lanes. In such cases, the predetermined route may correspond to the road or set of tracks rather than to an individual track or lane. In such a cases, the predetermined route may be considered to be an midpoint route such as one dimensional line/curve representing the middle of e.g. the road.

The predetermined route may accordingly constrain the spatial relationship between the vehicle 103 and the different access points as the vehicle 103 moves along the predetermined route.

As previously mentioned, in some systems access points may be arranged with two substantially colocated access points (or specifically with the antennas of a pair of access points being colocated) but with the two access points forming beams in different directions, (uproute or downroute). For example, directional antennas of two access points may be mounted on the same mast but use beamforming that directs beams in different directions. In particular, the two beams of the colocated access points may be aimed along opposite directions of the predetermined route along which the vehicle 103 is moving (e.g. in opposite directions of a road next to which the mast carrying the directional antennas are positioned). In many embodiments, the (antennas of) two access points may be substantially colocated and form directional beams in different, and typically opposite directions. However, the description and FIG. 8 will focus on the access points that form beams in one direction. Specifically, the description will focus on how forward facing wireless modems of a vehicle 103 can select suitable access points that form beams in the opposite direction, or on how backward facing wireless modems of a vehicle 103 can select access points forming beams in the opposite direction. Thus, FIG. 8 illustrates only one half of the access points that may be present to support a vehicle 103. It will be appreciated that in some embodiments, the system may only include access points forming beams in one direction only, and/or the vehicle 103 may only comprise wireless modems forming beams in a forward or backward direction.

The illustrated access points 801-807 thus form beams in the same direction along the predetermined route. Specifically, a projection of the direction of the main (gain) direction on the predetermined route will be in the same direction (uproute or downroute).

In the example, the access points 801-807 form beams in a direction which will be referred to as the first direction or the downroute direction. The approach will first be described with reference to an example where the vehicle 103 is moving in the opposite direction, i.e. in the uproute direction.

Each of the access points have an associated coverage area 811-817 in which wireless modems can access the access points 801-807. The access points 801-807 are arranged such that the coverage areas resulting from the formed beams are overlapping. Specifically, the coverage area 811 of a first access point 801 along the predetermined route 809 overlaps the coverage area 813 of the neighboring access point 803 in the first direction, i.e. further downroute. In the approach there is accordingly no gap in the coverage for a vehicle 103 moving along the predetermined route. Further, a first segment of the route within the coverage area 811 of a first access point 801 but not within the coverage area 813 of a second access point 803, and a second segment of the route within the coverage area 813 of the second access point 803 but not within the coverage area 811 of the first access point 801, are interconnected by a third segment which is both within the coverage area 811 of the first access point 801 and the coverage area 813 of the second access point 803. In the approach the segments/parts of the predetermined route that are only covered by the directional beam from one access point are separated by an intervening segment/part covered by directional beams by more than one access point, and specifically is covered by the access points of the segments divided by the intervening segment/part.

In the described example, each of the access points operates in a single frequency channel, i.e. each of the access points is allocated a frequency channel. The frequency channels typically have a large frequency bandwidth, and typically the bandwidth exceeds 500 MHz. The access points may specifically operate in accordance with IEEE 802.11ad Specifications with each frequency channel having a bandwidth of 2160 MHz. Within each frequency channel, different links may be setup, e.g. using TDMA or e.g. with the frequency channel bandwidth being divided into subchannels of smaller bandwidths.

The system may accordingly employ a frequency plan with each access point being allocated one frequency channel. In typical systems, the number of available frequency channels is substantially limited, for example in IEEE 802.11ad there may only be six different frequency channels available in total. Accordingly, the system will have a substantial reuse of frequency channels with different access points being allocated the same frequency/frequency channel.

However, in the system the wireless access points providing a contiguous overlapping coverage by forming beams in different directions are arranged such the neighboring access points are allocated different frequency channels.

Specifically, a set of a plurality frequency channels may be allocated to access points forming beams in one direction along the predetermined route, e.g. to the access points forming beams in the downroute direction. Another, and typically different and disjoint, set of frequency channels may be allocated to access points forming beams in the other direction, e.g. access points forming beams in the uproute direction.

The set of frequency channels that are allocated to the given direction, i.e. to downroute directed access points in the specific example, is then divided into (at least) a first set of frequency channels and a second frequency set of the frequency channels where the first and second sets are disjoint. Thus, a frequency channel may belong to the first set or to the second set but cannot belong to both the first and the second set.

The access points (forming beams in the given direction, i.e. downroute in the specific example) are then allocated frequency channels such that neighboring/adjacent access points are allocated a frequency channel from a different set. Thus, if an access point is allocated a frequency channel from the first set of frequency channels, its neighbor access points will be allocated a frequency channel from the second set of frequency channels. Thus, the access points are arranged such that the access points providing the overlapping coverage in the downroute direction have an alternating frequency channel allocation, i.e. with frequency channel alternately being allocated from the first or second set of frequency channels. A neighbor access point may be an adjacent access point (specifically along the predetermined route).

In many embodiments, the first and second sets of frequency channels may each contain only a single frequency channel. For example, the first set of frequency channels may include only channel 5 and the second set of frequency channels may include only channel 3. In such an example, the access points are accordingly alternately allocated frequency channels 3 and 5.

In the system, the vehicle 103 comprises a first wireless modem 111 and a second wireless modem 701 that are arranged to form beams in the same direction(s), i.e. they are aligned wireless modems. The wireless modems 111, 701 are arranged to communicate with downroute access points 801-807 i.e. they form beams in the uproute direction. In the specific described example, the vehicle 103 is moving in the uproute direction and thus the wireless modems 111, 701 are forwards directed wireless modems of the vehicle 103 and are directed in the direction of movement.

In the example, each of the uproute wireless modems 111,701 are arranged to only use a subset of the possible frequency channels. Specifically, the first wireless modem 111 is arranged to only use frequency channels from the first set of frequency channel and the second wireless modem 701 is arranged to communicate using only frequency channels from the second set of frequency channels.

For example, each of the uproute wireless modems 111, 701 is allocated a set of frequency channels which may be scanned and/or used for communication (receiving and/or transmitting). Thus, the wireless modem 111, 701 is only capable of using one of the frequency channels of the allocated set. The set allocated to the first wireless modem 111 is a set of frequency channels selected from the first set of frequency channels, such as the entire set, a subset, or a single frequency channel. The set allocated to the second wireless modem 701 is a set of frequency channels selected from the second set of frequency channels, such as the entire set, a subset, or a single frequency channel. In many embodiments, the first wireless modem 111 may be allocated a single frequency channel from the first set of frequency channels, e.g. frequency channel 5 and the second wireless modem 701 may be allocated a single frequency channel from the first set of frequency channels, e.g. frequency channel 3. For clarity and brevity, the following description will focus on such an example.

In embodiments where the first and/or second set of frequency channels comprise more than one frequency channel, the set of frequency channels being used by the wireless modems typically includes the frequency channels allocated to and used by the access points. However, in some embodiments, frequency channels may be allocated for use by the wireless modems without any knowledge of the specific frequency channels used by the access points from the set of possible frequency channels. In such a case, additional algorithms may be arranged to detect that a continuous communication is not achieved and the frequency channel allocation to the wireless modem may be changed accordingly. In some embodiments, the risk of selecting the "wrong" frequency channel at the wireless modem may simply be an acceptable risk.

In the system, the frequency channel allocation to the access points and the wireless modems is thus such that each of the wireless modems are effectively only able to connect to alternating access points. In essence, different sets of coverage areas and access points are provided for respectively the first wireless modem 111 and for the second wireless modem 701. The two wireless modems 111,701 will be supported by different sets of access points and effectively the first wireless modem 111 and the second wireless modem 701 connect to different subsets of the access points of the fixed network. For the vehicle network, the two wireless modems 111, 701 can be seen to provide two separate connections or links to the fixed network, and effectively they can be seen as providing two distinct air interface sub-communication systems.

This approach may prevent that the first wireless modem 111 and the second wireless modem 701 connect to the same access points and indeed it can be ensured that link diversity between links supported by respectively the first wireless modem 111 and the second wireless modem 701 are quite substantial as they will inherently and fundamentally form links with different access points. Typically, the coverage areas for the same set of access points, i.e. access points allocated frequency channels from the same set, will not be overlapping and thus each wireless modem cannot be continuously supported along the predetermined route. However, this may also have advantageous effects. For example, it improves the reliability of the access point selection by the individual wireless modem as there is typically only one possible candidate access point and the risk of accessing a suboptimal access point (e.g. not the nearest access point) may be substantially reduced.

Further, in the approach, the vehicle comprises a data session controller 713 which is arranged to communicate data of the data session over links provided by either the first or second wireless modem 111, 701. In the described example, the data session controller is specifically implemented as a functional unit connected to the NPU 705. It will be appreciated that in other embodiments, it may be implemented in another (logical) position in the vehicle 103 or may e.g. be implemented in the NPU 705.

The data session controller 713 may thus specifically be arranged to provide a single link for the data session to the rest of the vehicle network 709. Further, the common link may be formed by combining the communication capability that is provided by both the first wireless modem 111 and the second wireless modem 701. Specifically, if the first wireless modem 111 provides a usable link, the data session controller 713 may use this link for communication of data of the data session and if the second wireless modem 701 provides a usable link, the data session controller 713 may use this link for communication of data of the data session. If both the first and second wireless modems 111, 701 provides links, the data session controller 713 may for example communicate data of the data session over both links. Further, the arrangement of the access point frequency channel allocation, the beam forming to provide overlapping coverage in one direction, and the frequency channel allocation for the individual wireless modems is exploited by the data session controller 713 such that a continuous connection is provided by the common link as the vehicle moves along the predetermined route. The approach allows an approach where the data session controller 713 achieves a make before break access point change. As the vehicle moves along the predetermined route, the data session controller 713 can adapt such that the common link is first supported by the first wireless modem 111 (assuming that the vehicle 103 is at a part of the predetermined route only covered by an access point of the first set), then supported by both the first and second wireless modem 111, 701 as the vehicle moves into an overlapping coverage area, and then by the second wireless modem 701 as the vehicle moves out of the overlapping area. Thus, a continuous link/connection is provided to the end node 101 for the data session.

In many embodiments, the system may comprise a vehicle based link controller 715 which is arranged to control parameters of a link of one wireless modem based on a property or characteristic of a link of another wireless modem.

In the described example, the link controller 715 is specifically implemented as a functional unit connected to the NPU 705. It will be appreciated that in other embodiments, it may be implemented in another (logical) position in the vehicle 103 or may e.g. be implemented in the NPU 705.

Specifically, the link controller 715 may be arranged to initiate a link setup by the second wireless modem 701 in response to a mm wave radio link property for a link of the first wireless modem 111 meeting a criterion.

For example, when the first wireless modem 111 has formed an active link with a first access point, the first wireless modem 111 may continuously determine a mm wave radio link property for the active link. This mm wave radio link property may at regular intervals be fed to the link controller 715 (via the NPU 705) which may evaluate if the property meets a criterion and if so it may transmit a control signal to the second wireless modem 701 with a command for this to perform a link operation, such as to try to form a new link, to terminate an existing link, to evaluate a change of access point etc.

The mm wave radio link property may be any property that provides an indication of a property of a link of the first wireless modem 111. In many embodiments, the mm wave radio link property is indicative of a quality of a link, such as for example a signal strength, an error measure, a throughput rate, etc.

In some embodiments, the link controller 715 is arranged to initialize a setup of a new link by the second wireless modem 701 if a link quality measure for an active link of the first wireless modem 111 meets a criterion. If the criterion is met, the link controller 715 may transmit a message to the second wireless modem 701 that includes a command or request for a new link setup. If the second wireless modem 701 has no current active link, the second wireless modem 701 may start the active search for a new access point, e.g. searching for an access point beacon in the allocated frequency channel. If the second wireless modem 701 has a currently active link, the second wireless modem 701 may in response to the message terminate the currently active link and proceed to search for a new access point by searching for a new beacon in the allocated frequency channel. Thus, in some embodiments, the link controller 715 may be arranged to terminate an active link of the second wireless modem 701 and to initiate a (new) link setup by the second modem in response to a mm wave radio link property for a link of the first wireless modem meeting a criterion.

In some embodiments, the criterion may include a requirement that the radio link quality measure for the link of the first wireless modem 111 exceeds a quality threshold. Thus, the criterion may include or consist in the requirement that the radio link quality measure is indicative of the quality of the link of the first wireless modem 111 being better/higher than the quality threshold. In this case, the link controller 715 may accordingly be arranged to initiate a new link being setup by the second wireless modem 701 if the quality of the first link (the link of the first wireless modem 111) increases sufficiently.

This may be particularly suitable e.g. for a vehicle moving in the same direction as the direction in which the beams are directed, i.e. specifically for a vehicle 103 moving in the uproute direction and having wireless modems with beams formed in the uproute direction, or for a vehicle 103 moving in the downroute direction and having wireless modems with beams formed in the downroute direction.

In such cases, the first wireless modem may initiate a new link when it enters the coverage area 811 of a first access point 801. As the vehicle 103 moves towards the first access point 801, a link formed by the second wireless modem 701 may reduce in quality and may even be dropped due to low quality. However, the quality of the first link by the first wireless modem 111 increases. This continues until the first wireless modem 111/vehicle 103 passes the first access point 801 at which point it may drop very rapidly. In such a system, the approach to the first access point 801 can be detected by evaluating the radio link quality measure and if this is higher than a suitable threshold, it can be considered that the first wireless modem 111 is close to the first access point 203 and that the first link may very soon drop substantially in quality, or perhaps even drop completely. Accordingly, the link controller 715 may initiate that the second wireless modem 701 sets up a new link which is highly likely to be to the access point further uproute from the first access point 203. Thus, the approach may allow a new link to be setup for the second wireless modem 701 in readiness for the expected sudden drop in quality for the first link and the first wireless modem 111.

In some embodiments, the criterion may include a requirement that the radio link quality measure for the link of the first wireless modem 111 is below a quality threshold. Thus, the criterion may include or consist in the requirement that the radio link quality measure is indicative of the quality of the link of the first wireless modem 111 being worse/lower than the quality threshold. In this case, the link controller 715 may accordingly be arranged to initiate a new link being setup by the second wireless modem 701 if the quality of the first link (the link of the first wireless modem 111) decreases sufficiently.

This may be particularly suitable e.g. for a vehicle moving in the opposite direction to the direction in which the beams are directed, i.e. specifically for a vehicle 103 moving in the uproute direction and having wireless modems with beams formed in the downroute direction, or for a vehicle 103 moving in the downroute direction and having wireless modems with beams formed in the uproute direction.

For example, considering the vehicle 103 is moving downroute in FIG. 8, the first wireless modem may initiate a new link when it enters into the coverage area 811 of a first access point 801. As the vehicle 103 moves away from the first access point 801, the radio link quality measure will deteriorate and if it drops below a suitable level, it may indicate that the vehicle 103 is moving towards the edge of the coverage area. However, this may also be an indication that the vehicle 103 has passed the next downroute access point 803 and that this accordingly may be available for supporting the second wireless modem 701. Accordingly, the radio link quality measure for the first link falling below a threshold may be used to trigger the setup of a new link by the second wireless modem 701 (e.g. by beginning a scan and/or by terminating an existing link (which may be with an access point further uproute from the first access point 203)).

The above embodiments have the advantage of limiting the number of connected modems to the access points whilst still achieving the make before break connectivity. This advantage is important when there are many vehicles on the route and the number of connections to a single access point is limited.

In some embodiments, the link controller 715 may additionally or alternatively to controlling a link of the second wireless modem 701 be arranged to control a link operation for the first wireless modem 111, and may in some embodiments be arranged to control link operations for both wireless modems 111, 701.

In particular, in some embodiments, the link controller 715 may be arranged to terminate an active link of the first wireless modem 111 in response to a link being established by the second wireless modem 701. Thus, in some embodiments, when a new link is setup by one of the wireless modems 111, 701, this may terminate an active link by another wireless modem 111, 701. This may provide improved operation in many embodiments. For example, it may ensure that rather than keep using the resource of the first wireless modem 111 to support a link that may deteriorate and not provide a high throughput compared to the new link being setup, the link may instead be terminated thereby freeing up resource of the first wireless modem 111 to search for a new access point that potentially can provide an improved link. In some such embodiments, the termination of the existing link may be after a given delay which may be predetermined or possibly determined dynamically (e.g. dependent on the speed of the vehicle). Such a delay may adapt the operation and e.g. allow the existing link to be used together with the new link for a duration until the quality may have dropped (or be likely to soon drop) substantially.

In such a system, the link controller 715 may thus assist in the dynamic control of the link formations of the wireless modems as the vehicle 103 moves along the predetermined route. A more flexible and often improved access point selection can often be achieved.

The data session controller 713 may in different embodiments use different algorithms and approaches for providing a single link for the data session based on the links formed by the first wireless modem 111 and the second wireless modem 701. It may typically be arranged to combine the communication capacity and capability provided by the two wireless modems into a single combined communication capacity and capability. The end nodes and the remaining part of the vehicle network may simply connect to the air interface/access points via the data session controller 713 and the single link provided by this, and indeed may in many embodiments the rest of the vehicle network may not even have any knowledge that the communication is provided via a plurality of wireless modems, access points, or air interface links. The data session controller 713 may in many embodiments be arranged to provide a single link by using a link from the first wireless modem 111 if only the first wireless modem 111 has an active link, using a link from the second wireless modem 701 if only the second wireless modem 701 has an active link, and using a link from one or both of the first wireless modem 111 and the second wireless modem 701 if both wireless modems 111, 701 have an active link.

In some embodiments, the data session controller 713 may be arranged to form the common/single link in response to a selection between a link of the first wireless modem 111 and a link of the second wireless modem 701. In some embodiments, the data session controller 713 may accordingly perform a switch selection and combination such that data of the common link is communicated over a selected link of the first and second wireless modems 111, 701. The data session controller 713 may specifically be arranged to select a single link, and may specifically if only one link is available may select this link, and if both wireless modems 111, 701 provide a link may be arranged to select one of these links in accordance with a suitable selection criterion.

The data session controller 713 may specifically be arranged to change a selection from the link of one of the first wireless modems to the other while the first link is still active. Thus, as the vehicle 103 moves along the predetermined route, it may be in a segment which is only supported by one access point and one wireless modem, e.g. the first wireless modem 111. At some point, the vehicle 103 will move into an overlapping coverage area where the second wireless modem 701 will establish a second link to a suitable access point. At this point, the data session controller 713 is accordingly provided with two active links, and it will at some point switch the common link to be linked with the first link of the first wireless modem 111 to the second link of the second wireless modem 701. This selection change occurs at a point where both links are active and thus can be achieved without any interruption to the communication. A make before break change can be achieved, and continuous and uninterrupted communication for the data session can be provided using low complexity switch selection.

The exact criterion used for selecting the link may depend on the preferences and desires of the individual embodiment. In many embodiments, the selection between a link of the first wireless modem 111 and a link of the second wireless modem 701 may be in response to a link quality measure for each of the two links. For example, signal to noise ratio, error rate, throughput, signal strength etc. may be determined for each link and the selection may be based on these measures. For example, the data session controller 713 may select the link for which the highest link quality is indicated. Thus, a current link may be selected until a new link is set up and has reached a quality exceeding that of the first link. In other embodiments, more complex considerations may be included, such as an averaging of link quality measures, timing constraints or requirements, quality offsets etc.

In some embodiments, the data session controller 713 may be arranged to form the common link as combined data of a link of the first wireless modem and data of a link of the second wireless modem when both the link the first wireless modem is active and the link the second wireless modem is active. The data session controller 713 may for example dynamically utilize both links for data of the data session. In such embodiments, the fixed network may comprise a complementary function which is also arranged to combine two possible links into a single link for the data session for the remaining network.

Specifically, the data session controller 713 and the fixed network may implement complementary multipath controllers that flexibly can manage communication over subflows where the links formed by the first and second wireless modems each providing a subflow.

Such a multipath controller may split a flow into multiple subflows which are then combined at the complementary multipath controller.

Figure 9:
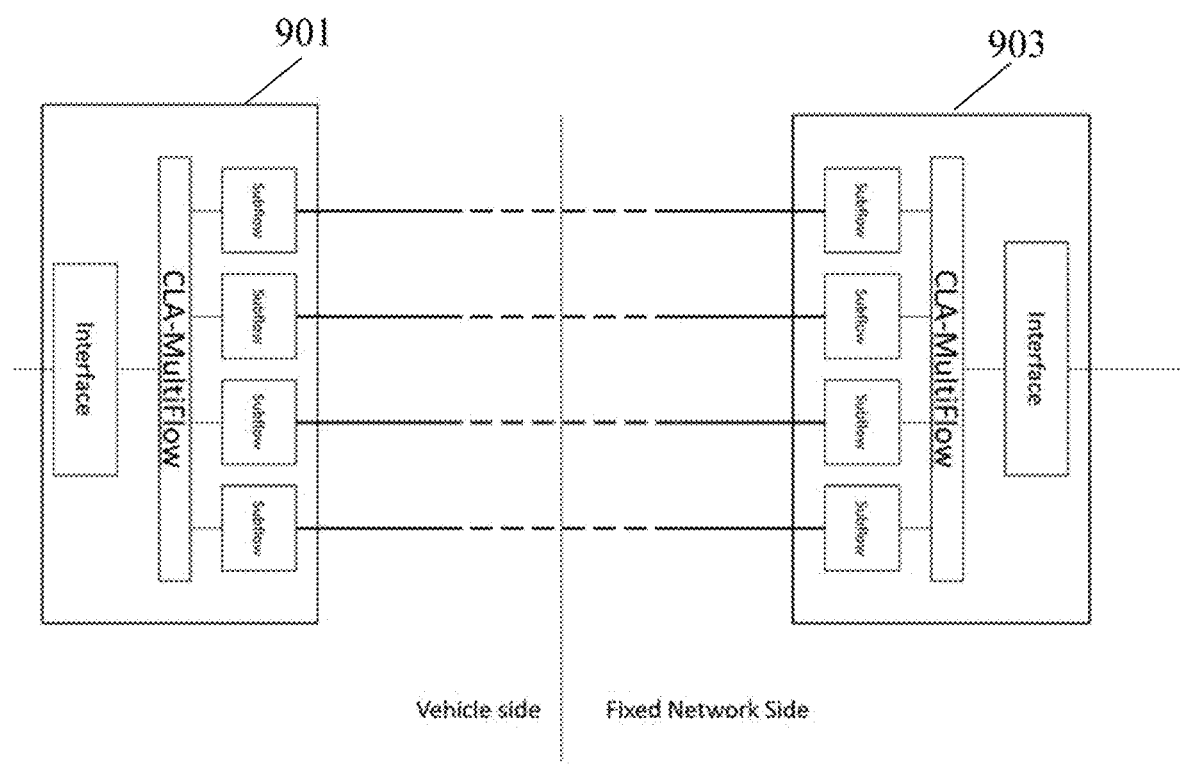
FIG. 9 and FIG. 10 illustrate examples of elements of a multipath controller arrangement suitable for a wireless communication system in accordance with some embodiments of the invention.

FIG. 9 illustrates an example of two multipath controllers utilizing subflows of multiple paths for communication. In the example, a vehicle multipath controller 901 may provide a single flow connection for the vehicle side network and a fixed network multipath controller 903 may provide a single flow connection for the fixed network. The connection between the two multipath controllers is however by a plurality of subflows each of which may use a different path. Thus, a data packet received by one multipath controller 1201 may be communicated to the complementary multipath controller 1203 via one of the subflows/paths (and vice versa). Each subflow may correspond to a single link over the air interface. As the vehicle 103 moves along the predetermined route, new subflows may thus be created and abandoned. Further, in overlapping coverage areas, more than one subflow is active simultaneously. Alternatively or equivalently, each subflow may be implemented as corresponding to one wireless modem an as the vehicle 103 moves along the predetermined route, the link quality of the subflow (and thus the throughput rate) varies substantially (including being zero when no link is formed by the wireless modem corresponding to the subflow).

Figure 10:
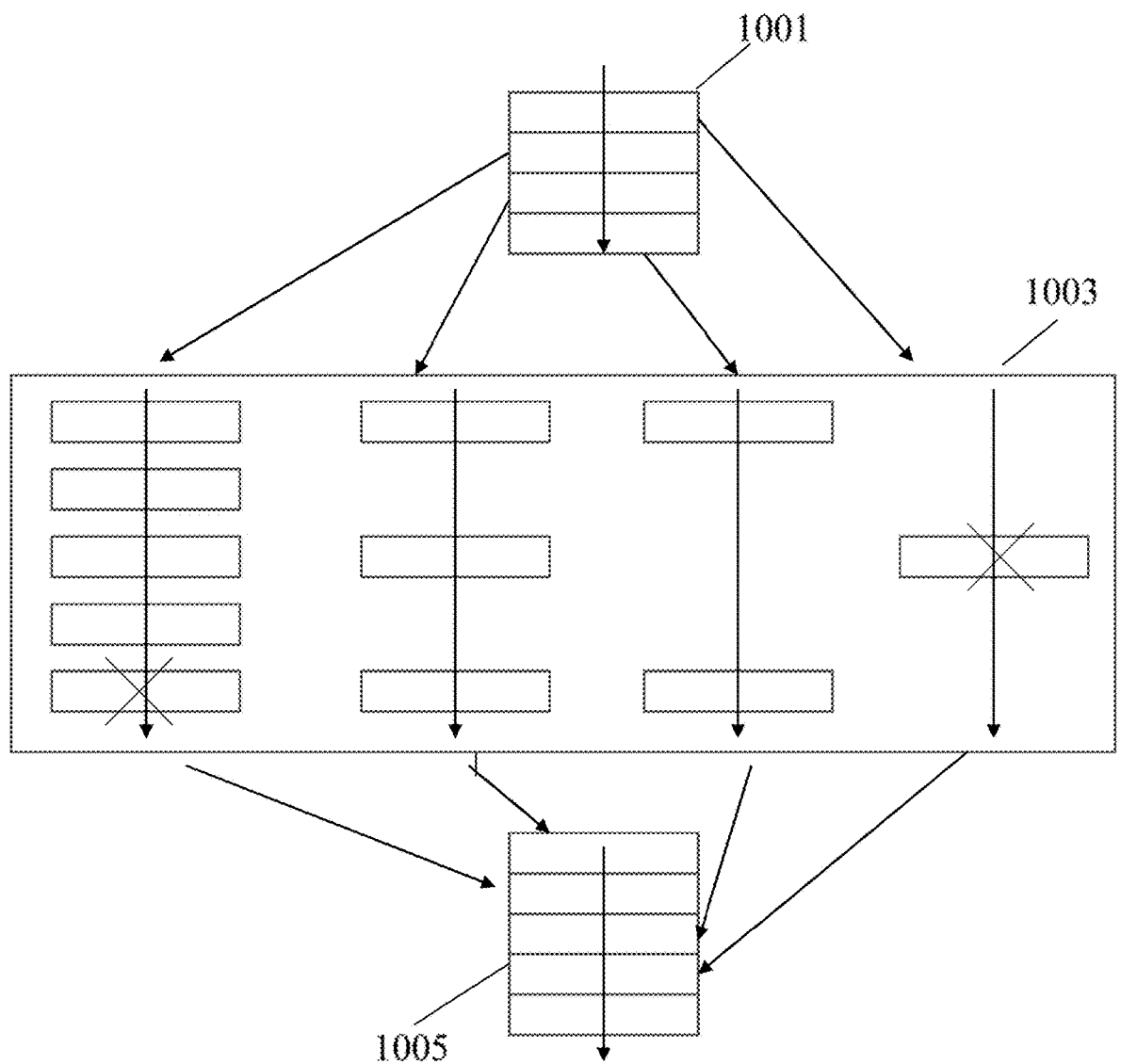

FIG. 10 illustrates an example of the operation of the multipath subflow communication. In the example, an input set of data packets 1001 are received in a given order. These may be routed via a plurality of subflows 1003 with data packets being distributed over the different subflows 1003. The subflows 1003 may then be combined into a single flow 1005, i.e. a single set of output data packets may be generated.

Due to different properties of the different subflows, the data packets may be received in a different order than in the input set of data packets 1001, and the receiving multipath controller may reorder the output data packets to have the correct order to generate and in-sequence data output.

In some embodiments, the multipath controllers may be arranged to dynamically and flexibly manage the subflow communication. In some embodiments, the multipath controllers may be arranged to communicate data simultaneously over several paths/flows. For example, a multipath controller may maintain a FIFO buffer for each subflow and may allocate new data packets to subflows depending on the level of filling of each subflow buffer. In other embodiments, a slower or less flexible approach may be used. For example, the multipath controller may simply allocate data to one subflow as long as the buffer level does not increase above a given level. If this level is exceeded, it may indicate that the link/path for that subflow is no longer efficient (e.g. due to the mm wave radio communication links for that path no longer being able to support communication) and it may switch to exclusively use a different subflow for future communication.

The previous description has focused on examples where the beams of the wireless modems where formed in the forward direction and specifically with the angular interval of the beams formed by the wireless modems 111, 701 including an angle in an opposite direction along the predetermined route to the direction in which the access points are formed when the vehicle 103 is moving in the opposite direction to the this direction along the predetermined route. E.g., in the example of FIG. 8, the vehicle 103 is moving in the uproute direction and the wireless modems 111, 701 form beams in the uproute direction whereas the access points 801-805 form beams in the downroute direction. Of course, this scenario also corresponds to the mirror image where the vehicle 103 is moving in the downroute direction with wireless modem beams being formed in the downroute direction and the access points forming beams in the uproute direction.

However, in other embodiments, the beams of the wireless modems may be in the rearward/backward direction of the vehicle 103 and may point backwards of the movement of the vehicle 103 along the predetermined route. In some embodiments, the angular interval of the beams formed by the wireless modems 111, 701 may include an angle in the opposite direction along the predetermined route to the direction of the beams formed by the access points when the vehicle 103 is moving in this direction along the predetermined route.

This may for example correspond to the example of FIG. 8 but with the exception that the vehicle 103 is moving in the downroute direction (but with all beams in the same direction).

In this example, the same combination of high reliability of wireless modems selecting a new access point as the next access point in the direction of movement (rather than e.g. the same access point as that currently accessed by the other movement) while ensuring continuation of connection can still be achieved. In particular, in many embodiments and scenarios, the approach may provide an operation where when a current link degrades as the vehicle 103 moves further away from its serving access point, the other modem will be arranged to attach to the next access point in the direction of movement and will not attach to the same access point. As the first link degrades and the other access point accesses the next access point along the movement direction, the new link will achieve better performance and it can take over from the first link. Further, as the two access points have overlapping coverage areas, this is likely to happen within this coverage area and thus at least one access point will always be available to the wireless modems.

Figure 11:
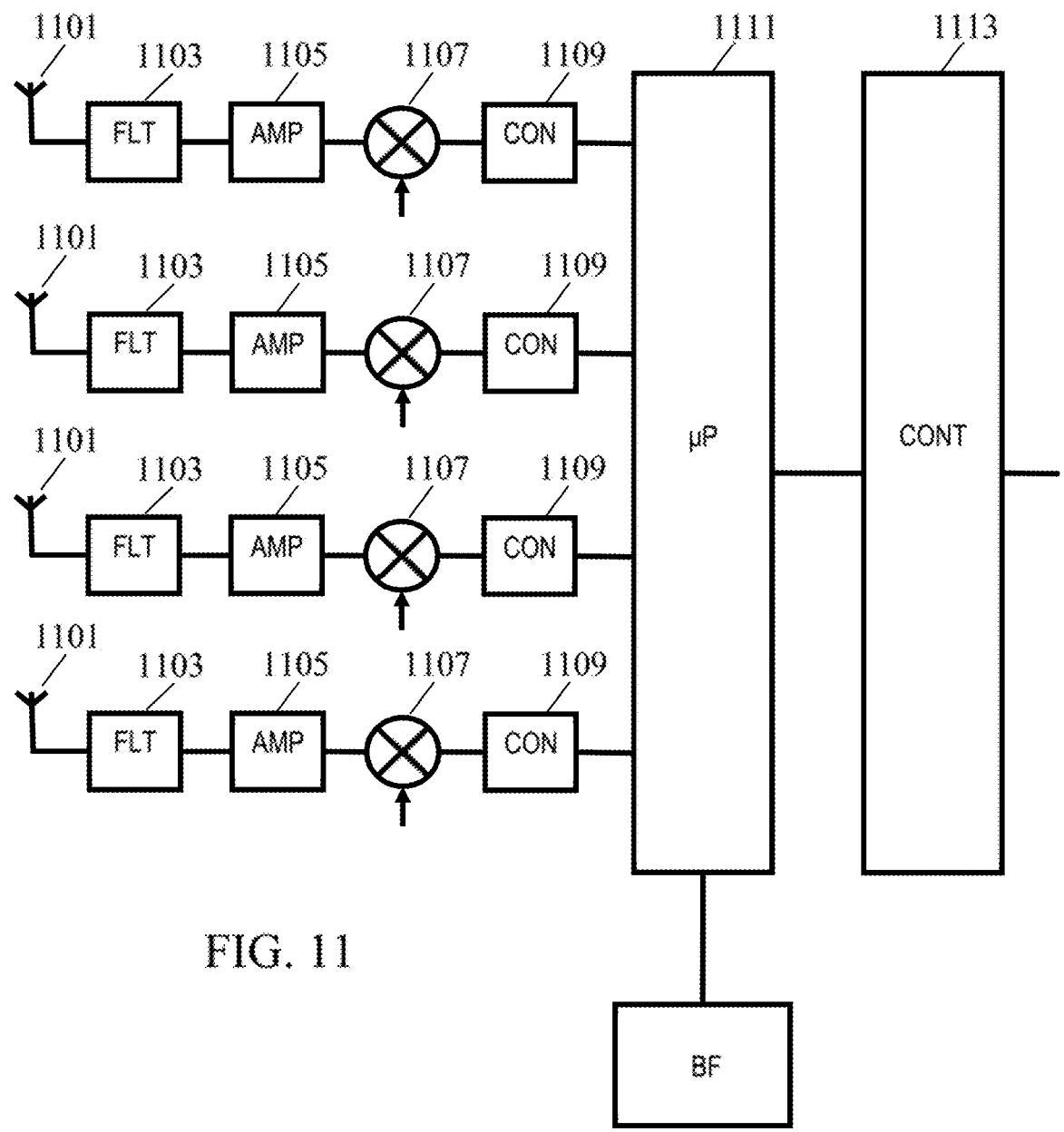
FIG. 11 illustrate examples of elements of an apparatus for communicating over the air interface of a wireless communication system in accordance with some embodiments of the invention.

FIG. 11 illustrates an example of an apparatus for communicating over the air interface of the described system. The following description of the apparatus of FIG. 11 may specifically be applicable (as appropriate) to any of the access points and to any of the wireless modems.

In the example, the apparatus uses an adaptive antenna approach where directional beams are formed using a plurality of antenna elements 1101. In the example of FIG. 11, the adaptive antenna comprises four antenna elements but it will be appreciated that in other embodiments, there may be fewer or more antenna elements.

The apparatus comprises a bidirectional signal path for each antenna elements. For transmitting, the signal path direction is towards the antenna element 1101 and for receiving the signal path direction is from the antenna element. In the example, the signal path for each antenna element 1109 is the same and comprises the same functionality. The following description of a first of the signal paths will accordingly also apply to the other signal paths and antenna elements.

The antenna element 1101 is coupled to a filter 1103. The filter 1103 is arranged to filter signals outside the desired frequency range, such as e.g. outside the frequency channel or outside a frequency band wide enough to include all frequency channels. In such cases, other filtering may e.g. be performed in the digital domain and e.g. at lower frequencies. The filter may be implemented as an analogue filter using capacitors and inductors. In some implementations, the same filter may be used both for receive and transmit and in other embodiments different filters may be used for receive and transmit with e.g. the filters being combined by a duplexer.

The filter 1103 is coupled to an amplifier 1105 which is arranged to amplify a received signal in the receive configuration and to amplifier a transmit signal in the transmit configuration. The amplifier 1105 may often be implemented as an electronic amplifier circuit based on discrete component such as field effect transistors and/or may be implemented as an integrated amplification circuit. In the receive configuration, the amplifier 1105 is typically a low noise amplifier and in the transmit configuration, the amplifier 1105 is typically a power amplifier.

The amplifier 1105 is coupled to a frequency converter 1107 which for example may be a mixer or multiplier circuit. The frequency converter 1107 is fed a conversion frequency signal which may be mixed with the receive or transmit signal to effect the frequency conversion. The conversion frequency signal may be provided by a local oscillator.

In the receive configuration, the received amplified signal may be downconverted to a lower frequency signal, such as an IF signal or a baseband signal. In the transmit configuration, the transmit signal may be upconverted to a higher frequency signal, such as from an IF signal or a baseband signal to the transmit frequency (and specifically to the frequency of the frequency channel).

In many embodiments, the function of a filter, amplifier, frequency converter may be repeated for intermediate frequencies.

In the example of FIG. 11 however, the frequency converter 1107 is coupled to a converter 1109 which is arranged to convert between the analog and digital domain. In the receive configuration, the converter 1109 comprises an analog to digital conversion circuit which converts the analog received signal to a digital signal. In the transmit configuration, the converter 1109 comprises a digital to analog conversion circuit which converts a provided digital transmit signal to an analog transmit signal.

The converter 1109 is coupled to a digital processor 1111 which is arranged to perform digital signal processing. The digital processor 1111 may specifically be implemented by a microprocessor, microcontroller, computer unit, or any other circuit capable of processing signals and executing software or firmware.

The digital processor 1111 may be arranged to execute a method which combines (typically by summation) the digitized received signals into a received signal which is then demodulated and decoded to extract the received data. The digital processor 1111 is coupled to a controller 1113 which is fed the received data and which provides data for transmission by the apparatus. The controller 1113 may be implemented as a digital signal processor, microprocessor, microcontroller, or any other circuit or computing means that may execute a method, software, or firmware. The controller 1113 and the digital processor 1111 may in many embodiments be implemented by the same computational platform/function.

In the transmit configuration, the digital processor 1111 is arranged to generate the digitized transmit signal to the converter 1109 for converting to the digital domain. In many embodiments, the digital processor 1111 may be arranged to generate the transmit signal as a modulated signal and may be arranged to add error control coding etc.

In general, the digital processor 1111 may be arranged to perform the necessary operations to implement a required time frame structure, providing data buffer functionality, implementing error control and correction, etc.

The controller 1113 may further be arranged to interface to other functions, and specifically may provide a network interface allowing the apparatus to communicate with a network. Specifically, if the apparatus is a wireless modem, the controller 1113 may be arranged to interface with an NPU or the vehicle network. If the apparatus is an access point, the controller 1113 may be arranged to interface with the fixed network.

The apparatus further comprises a beamformer 1115 which is arranged to control the apparatus to form a beam in the desired direction. In the example, this is done by adapting a phase, (complex) gain, or delay for each individual signal path to provide the desired directionality for the apparatus. In some embodiments, the signal path adaptation may be performed in the digital domain by adapting the complex gain, delay, or phase of the individual signals for the individual path. The beamformer 1115 may control the digital processor 1111 to introduce the desired effect.

In other embodiments, the beamformer 1115 may e.g. adapt a phase of the individual analog local oscillator signal/conversion frequency fed to the converter 1107.

In many embodiments, the coverage area for an access point includes a neighbor access point in a direction along the predetermined route in which the access point forms the beam. The range of an access point may exceed (e.g. by no less than 5%, 10%, 20% or more) a distance to a neighbor access point in the direction of the beam formed by the access point.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. A claim indicated to be dependent on one claim may also be dependent on all other claims. Specifically, a claim being defined as being dependent on claim 1 may be dependent on all previous claims, and specifically a reference to "claim 1" may be replaced by a reference to "any previous claim". Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

We claim:

1. A communication system for supporting communication between an end node of a vehicle moving along a predetermined route and a remote correspondent node via a fixed network, the communication system comprising:
 a plurality of wireless access points of the fixed network, each wireless access point having a directional antenna arrangement for mm wave radio communication using directional beams directed in a same first direction along the predetermined route;
 at least a first wireless modem and a second wireless modem arranged to establish mm wave radio communication links to wireless access points of the plurality of wireless access points, the mm wave radio communication links supporting a data session between the end node and the remote correspondent node, the first wireless modem and the second wireless modem being located on the vehicle and employing electronically steerable beamforming directional antennas for establishing the mm wave radio communication links using directional beams;

wherein each wireless access point of the plurality of wireless access points is arranged to communicate with wireless modems using a frequency channel from either a first set of frequency channels or from a second set of frequency channels such that neighboring access points along the predetermined route use frequency channels from different sets of the first set of frequency channels and the second set of frequency channels;

the first wireless modem is arranged to communicate using a frequency channel from the first set of frequency channels and the second wireless modem is arranged to communicate using a frequency channel from the second set of frequency channels;

the wireless access points are arranged to provide directional beams providing overlapping coverage between neighboring access points along the predetermined route;

and the communication system further comprises a data session controller arranged to communicate data of the data session over links provided by the first wireless modem and the second wireless modem, the data session controller being located on the vehicle; wherein the first wireless modem and the second wireless modem are arranged to form beams having a main direction constrained to an angular interval not exceeding 90° from a movement direction of the vehicle.

2. The communication system of claim 1, wherein the angular interval includes an angle in an opposite direction along the predetermined route to the first direction when the vehicle is moving in the opposite direction to the first direction along the predetermined route.

3. The communication system of claim 1, wherein the angular interval includes an angle in an opposite direction along the predetermined route to the first direction when the vehicle is moving in the first direction along the predetermined route.

4. The communication system of claim 1, wherein a distance between the electronically steerable beamforming directional antennas of the first wireless modem and the second wireless modem does not exceed 20 meters.

5. The communication system of claim 1, wherein the data session controller is arranged to form a common link for the data session in response to a selection between a link of the first wireless modem and a link of the second wireless modem, the data session controller being arranged to change a selection from the link of the first wireless modem to the link of the second wireless modem while the link of the first wireless modem is active.

6. The communication system of claim 1, wherein the data session controller is arranged to select a link for data of the date session in response to a link quality for a link of the first wireless modem and a link quality of a link of the second wireless modem.

7. The communication system of claim 1, wherein the data session controller is arranged to form a common link for the data session as a combination of a link of the first wireless modem and a link of the second wireless modem, the data session controller being arranged to communicate data of the data session over both the link the first wireless modem and the link the second wireless modem.

8. The communication system of claim 1, further comprising a link controller arranged to initiate a link setup by the second wireless modem in response to a mm wave radio link property for a link of the first wireless modem meeting a criterion.

9. The communication system of claim 8, wherein the criterion includes a requirement that a radio link quality measure for the link of the first wireless modem exceeds a quality threshold.

10. The communication system of claim 8, wherein the criterion includes a requirement that a radio link quality measure for the link of the first wireless modem is below a quality threshold.

11. The communication system of claim 1, further comprising a link controller arranged to terminate an active link of the first wireless modem in response to a link being formed by the second wireless modem.

12. An apparatus for a communication system for supporting communication between an end node of a vehicle moving along a predetermined route and a remote correspondent node via a fixed network, the communication system comprising:

a plurality of wireless access points of the fixed network, each wireless access point having a directional antenna arrangement for mm wave radio communication using directional beams directed in a same first direction along the predetermined route;

and the apparatus comprising:

at least a first wireless modem and a second wireless modem arranged to establish mm wave radio communication links to wireless access points of the plurality of wireless access points, the mm wave radio communication links supporting a data session between the end node and the remote correspondent node, the first wireless modem and the second wireless modem being located on the vehicle and employing electronically steerable beamforming directional antennas for establishing the mm wave radio communication links using directional beams;

wherein each wireless access point of the plurality of wireless access points is arranged to communicate with wireless modems using a frequency channel from either a first set of frequency channels or from a second set of frequency channels such that neighboring access points along the predetermined route use frequency channels from different sets of the first set of frequency channels and the second set of frequency channels;

the first wireless modem is arranged to communicate using a frequency channel from the first set of frequency channels and the second wireless modem is arranged to communicate using a frequency channel from the second set of frequency channels;

the wireless access points are arranged to provide directional beams providing overlapping coverage between neighboring access points along the predetermined route;

and the apparatus further comprises a data session controller arranged to communicate data of the data session over links provided by the first wireless modem and the second wireless modem, the data session controller being located on the vehicle; and wherein the first wireless modem and the second wireless modem are arranged to form beams having a main direction constrained to an angular interval not exceeding 90° from a movement direction of the vehicle.

13. A method of operation for a communication system supporting communication between an end node of a vehicle moving along a predetermined route and a remote correspondent node via a fixed network, the communication system comprising:
- a plurality of wireless access points of the fixed network, each wireless access point having a directional antenna arrangement for mm wave radio communication using directional beams directed in a same first direction along the predetermined route;
- at least a first wireless modem and a second wireless modem arranged to establish mm wave radio communication links to wireless access points of the plurality of wireless access points, the mm wave radio communication links supporting a data session between the end node and the remote correspondent node, the first wireless modem and the second wireless modem being located on the vehicle and employing electronically steerable beamforming directional antennas for establishing the mm wave radio communication links using directional beams;
- the method comprising:
  - each wireless access point of the plurality of wireless access points is communicating with wireless modems using a frequency channel from either a first set of frequency channels or from a second set of frequency channels such that neighboring access points along the predetermined route use frequency channels from different sets of the first set of frequency channels and the second set of frequency channels;
  - the first wireless modem communicating using a frequency channel from the first set of frequency channels and the second wireless modem is arranged to communicate using a frequency channel from the second set of frequency channels;
  - the wireless access points providing directional beams providing overlapping coverage between neighboring access points along the predetermined route;
- and a data session controller communicating data of the data session over links provided by the first wireless modem and the second wireless modem, the data session controller being located on the vehicle; and wherein the first wireless modem and the second wireless modem are arranged to form beams having a main direction constrained to an angular interval not exceeding 90° from a movement direction of the vehicle.

\* \* \* \* \*